(12) United States Patent
Liao

(10) Patent No.: US 7,258,353 B2
(45) Date of Patent: Aug. 21, 2007

(54) STROLLER HAVING FRONT WHEEL POSITIONING DEVICE

(75) Inventor: Gordon Liao, Yung Kang (TW)

(73) Assignee: Unique Product & Design Co., Ltd., Yung Kang (TW)

( * ) Notice: Subject to any disclaimer, the term of this patent is extended or adjusted under 35 U.S.C. 154(b) by 180 days.

(21) Appl. No.: 11/204,249

(22) Filed: Aug. 15, 2005

(65) Prior Publication Data

US 2007/0035096 A1   Feb. 15, 2007

(51) Int. Cl.
*B62B 9/12*   (2006.01)

(52) U.S. Cl. ........................................ 280/47.38; 16/19

(58) Field of Classification Search ............. 280/47.38, 280/62; 16/19
See application file for complete search history.

(56) References Cited

U.S. PATENT DOCUMENTS

| | | | | |
|---|---|---|---|---|
| 5,669,624 A * | 9/1997 | Eichhorn | .................... | 280/642 |
| 6,402,166 B1 * | 6/2002 | Chiu | ....................... | 280/47.38 |
| 6,449,801 B1 * | 9/2002 | Durrin | .......................... | 16/47 |
| 6,584,641 B1 * | 7/2003 | Milbredt | ..................... | 16/35 R |
| 6,671,926 B2 * | 1/2004 | Huang | ......................... | 16/35 R |
| 6,779,804 B1 * | 8/2004 | Liu | .......................... | 280/47.38 |
| 6,871,380 B2 * | 3/2005 | Chen | ......................... | 16/35 R |
| 6,974,150 B2 * | 12/2005 | Jane Santamaria | .......... | 280/647 |
| 7,083,175 B1 * | 8/2006 | Liu | ......................... | 280/47.38 |
| 2006/0043688 A1 * | 3/2006 | Chang | ..................... | 280/47.38 |
| 2006/0103114 A1 * | 5/2006 | Huang | ......................... | 280/642 |
| 2006/0261565 A1 * | 11/2006 | Tan | ......................... | 280/47.38 |
| 2007/0035096 A1 * | 2/2007 | Liao | ........................ | 280/47.38 |
| 2007/0063470 A1 * | 3/2007 | Lan | .......................... | 280/47.38 |

* cited by examiner

*Primary Examiner*—Jeff Restifo
(74) *Attorney, Agent, or Firm*—Alan Kamrath; Kamrath & Associates PA

(57) ABSTRACT

A stroller includes a main frame, a pedal, a front wheel frame, and a positioning device. The positioning device includes a lower cover, an upper cover, a rotation knob, and a locking rod. Thus, the front wheel frame is locked to and unlocked from the main frame by moving the drive plate of the rotation knob, so that the positioning device is operated easily and rapidly. In addition, when the positioning device is unlocked, a click sound is produced so as to notify the user that the positioning device is unlocked and the front wheel frame is rotatable relative to the main frame freely, thereby facilitating the user judging the state (locked or unlocked) of the front wheel frame.

15 Claims, 14 Drawing Sheets

STROLLER HAVING FRONT WHEEL POSITIONING DEVICE

BACKGROUND OF THE INVENTION

1. Field of the Invention

The present invention relates to a stroller, and more particularly to a stroller having a front wheel positioning device.

2. Description of the Related Art

A conventional stroller in accordance with the prior art shown in FIGS. 9-14 comprises a main frame 5 having a support seat 50, a front wheel frame 52 pivotally mounted on the main frame 5, a front wheel 54 rotatably mounted on the front wheel frame 52, and a positioning device 2 mounted between the support seat 50 of the main frame 5 and the front wheel frame 52 to releasably lock the front wheel frame 52 on the main frame 5. The positioning device 2 is located under the main frame 5 and includes a top cover 21, a base 23 secured to the top cover 21 by a plurality of posts 232 and having an inner wall formed with two ramps 231, a rotation knob 22 rotatably mounted on the base 23 and having an upper portion formed with a drive plate 221 for rotating the rotation knob 22 and a lower portion formed with two ramps 222 slidable on the two ramps 231 of the base 23, and a locking rod 24 extended through the top cover 21, the rotation knob 22 and the base 23. In operation, the drive plate 221 is driven to rotate the rotation knob 22, and the two ramps 222 of the rotation knob 22 are slidable on the two ramps 231 of the base 23 to move the rotation knob 22 which moves the locking rod 24 to lock the front wheel frame 52 on the main frame 5 and unlock the front wheel frame 52 from the main frame 5 as shown in FIGS. 13 and 14.

However, the positioning device 2 is located under the main frame 5, so that a user has to lower his body to drive the drive plate 221 to rotate the rotation knob 22 so as to operate the positioning device 2, thereby causing inconvenience to the user. In addition, the positioning device 2 is stopped by the main frame 5, so that the user cannot identify the state (locked or unlocked) of the front wheel frame 52.

SUMMARY OF THE INVENTION

The primary objective of the present invention is to provide a stroller having a wheel positioning device that is operated easily and conveniently.

Another objective of the present invention is to provide a stroller, wherein the wheel positioning device is operated to lock and unlock the wheel frame exactly.

A further objective of the present invention is to provide a stroller, wherein the front wheel frame is locked to and unlocked from the main frame by moving the drive plate of the rotation knob, so that the positioning device is operated easily and rapidly, thereby facilitating a user locking and unlocking the front wheel frame.

A further objective of the present invention is to provide a stroller, wherein when the positioning device is unlocked, a click sound is produced so as to notify the user that the positioning device is unlocked and the front wheel frame is rotatable relative to the main frame freely, thereby facilitating the user judging the state (locked or unlocked) of the front wheel frame.

Further benefits and advantages of the present invention will become apparent after a careful reading of the detailed description with appropriate reference to the accompanying drawings.

DETAILED DESCRIPTION OF THE INVENTION

Figure 1:
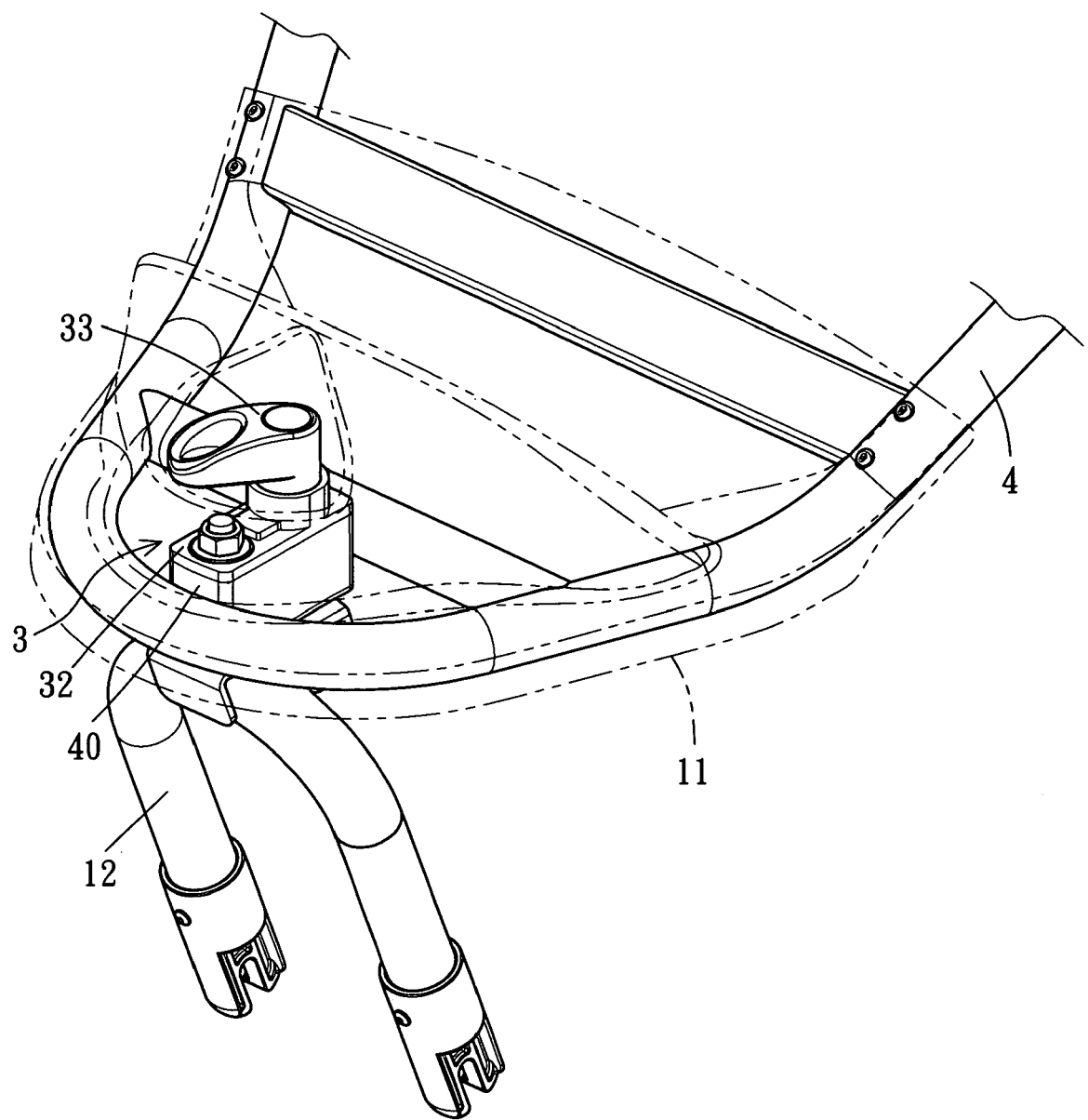
FIG. 1 is a perspective view of a stroller in accordance with the preferred embodiment of the present invention.
Figure 2:
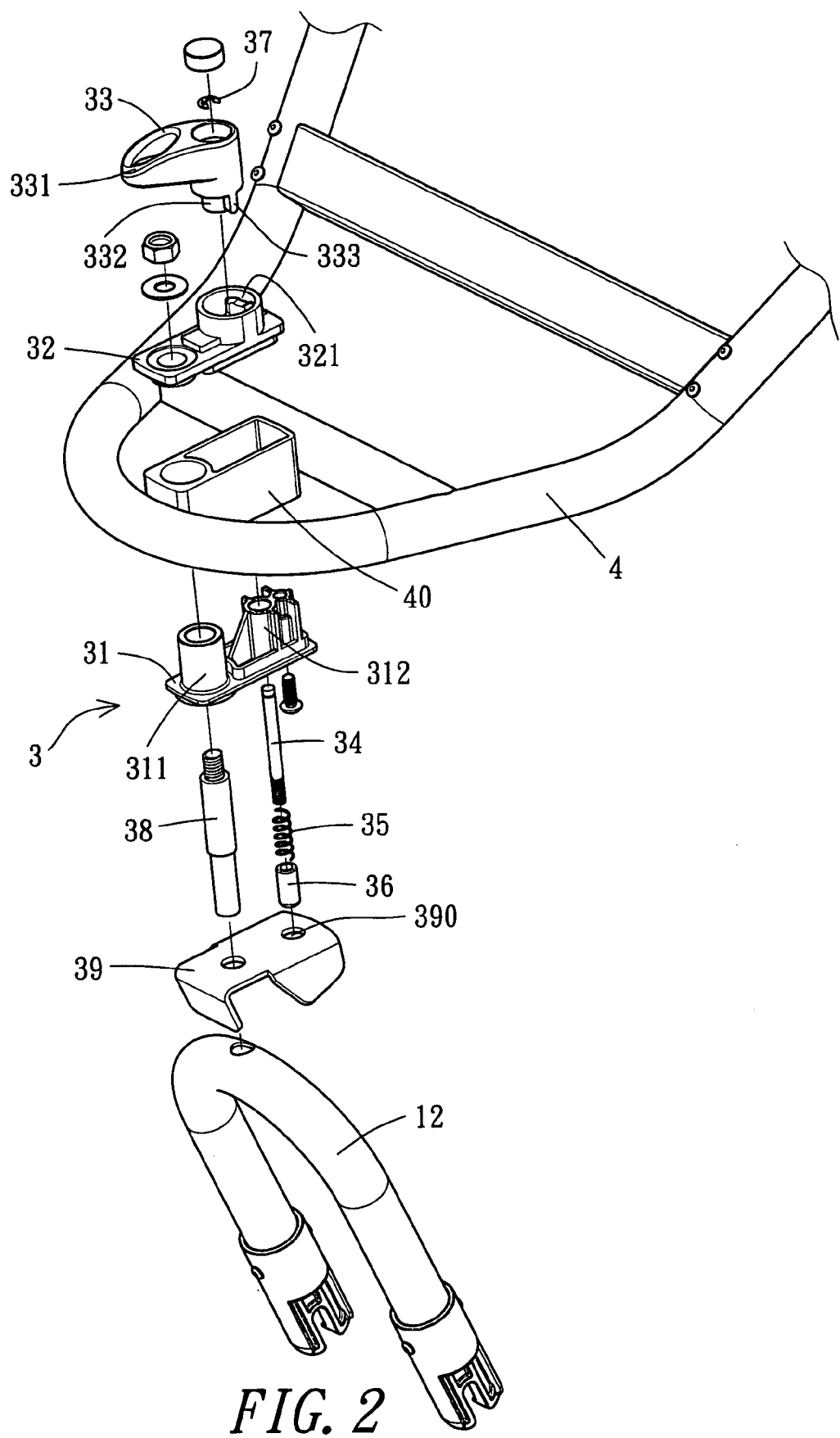
FIG. 2 is an exploded perspective view of the stroller as shown in FIG. 1.
Figure 3:
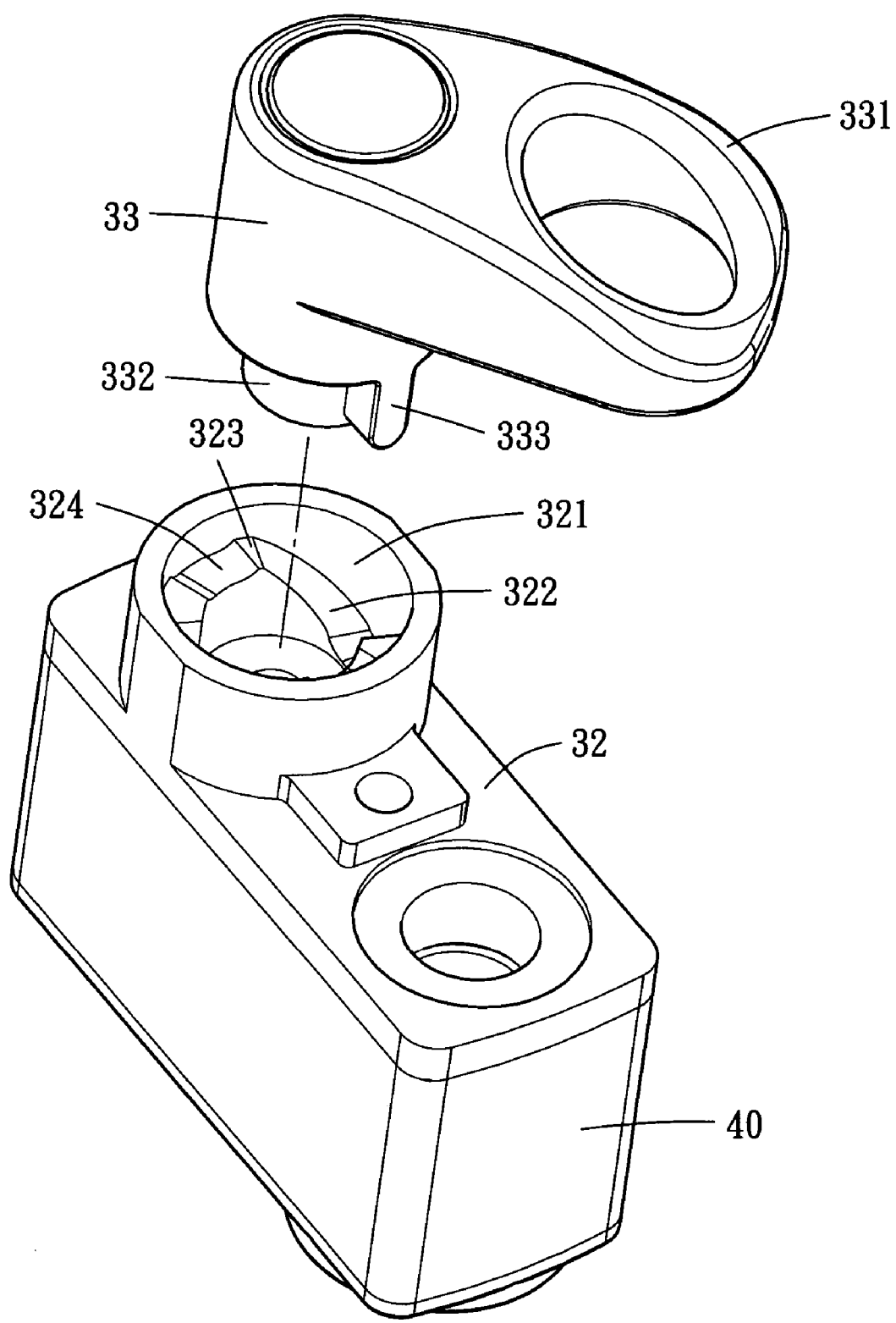
FIG. 3 is a partially exploded perspective view of the stroller as shown in FIG. 1.
Figure 4:
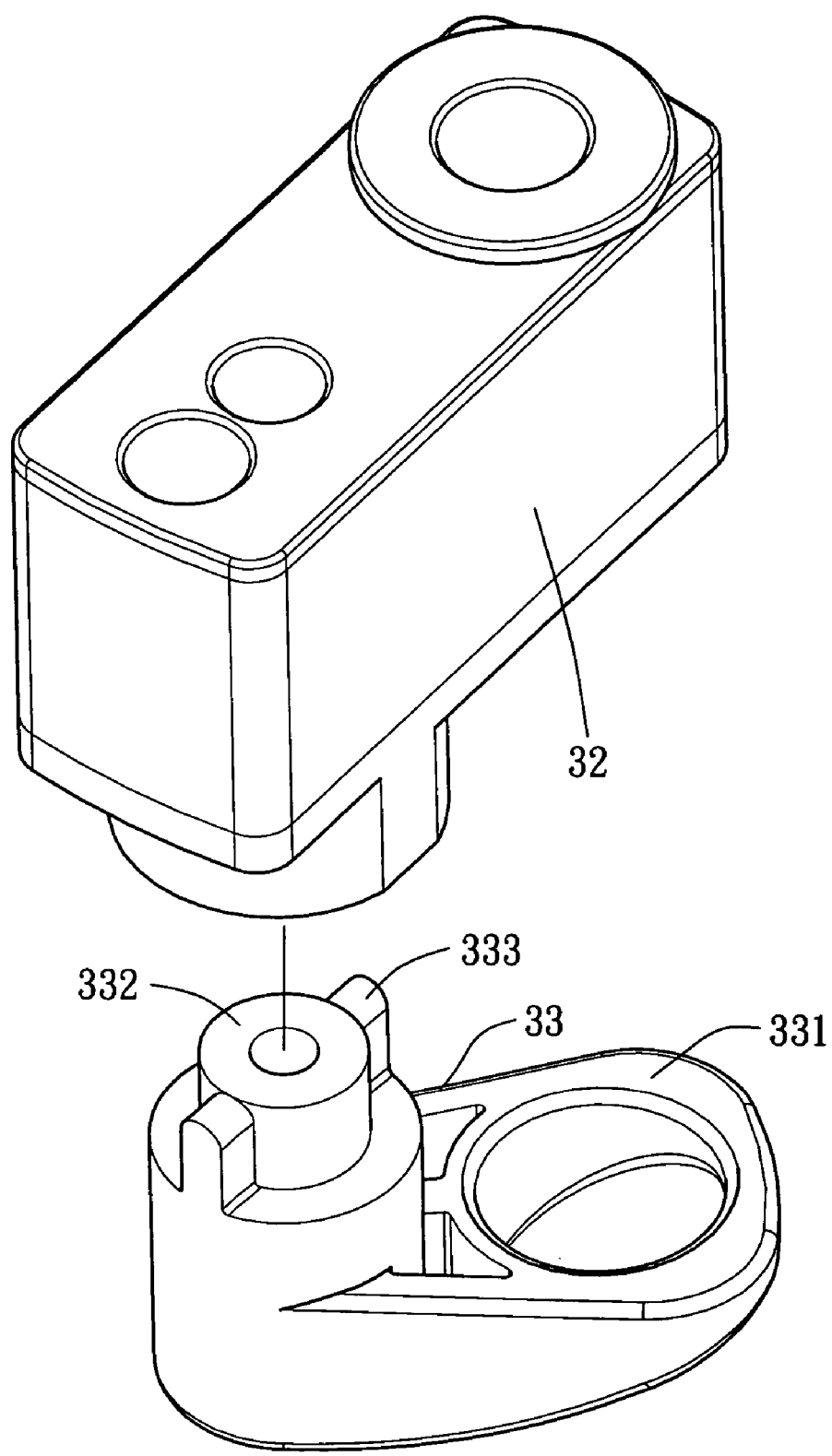
FIG. 4 is a partially exploded perspective view of the stroller as shown in FIG. 1.

Referring to the drawings and initially to FIGS. 1-5, a stroller in accordance with the preferred embodiment of the present invention comprises a main frame 4 having a support seat 40, a pedal 11 mounted on the main frame 4 and located beside the support seat 40 of the main frame 4, a front wheel frame 12 releasably mounted on the main frame 4, and a positioning device 3 mounted between the main frame 4 and the front wheel frame 12 to releasably lock the front wheel frame 12 on the main frame 4.

The positioning device 3 includes a lower cover 31 mounted on a lower portion of the support seat 40 of the main frame 4 and having a sleeve 312, an upper cover 32 mounted on an upper portion of the support seat 40 of the main frame 4 and having a chamber 321, a rotation knob 33 rotatably mounted on the upper cover 32 and having an upper portion formed with a drive plate 331 protruded outward from the pedal 11 for rotating the rotation knob 33 and a lower portion formed with a movable shaft 332 movably mounted in the chamber 321 of the upper cover 32, and a locking rod 34 movably mounted in the sleeve 312 of the lower cover 31 and having an upper portion secured to the movable shaft 332 of the rotation knob 33 to move therewith and a lower portion movable between a first position where the front wheel frame 12 is locked by the locking rod 34 so that the front wheel frame 12 is fixed on the main frame 4 and a second position where the front wheel frame 12 is unlocked from the locking rod 34 so that the front wheel frame 12 is rotatable relative to the main frame 4 freely.

The lower cover 31 has a first end formed with the sleeve 312 and a second end formed with a bushing 311 mounted in the support seat 40 of the main frame 4. The sleeve 312 of the lower cover 31 is extended into and received in the support seat 40 of the main frame 4.

The chamber 321 of the upper cover 32 has a substantially cylindrical shape. The upper cover 32 has two ramps 322 located in the chamber 321 and directed two opposite directions. Each of the two ramps 322 of the upper cover 32 has a top formed with a convex face 323 and a concave face 324 located at a rear portion of the convex face 323.

The movable shaft 332 of the rotation knob 33 is axially movable in the chamber 321 of the upper cover 32 by rotation of the rotation knob 33. The movable shaft 332 of the rotation knob 33 has an outer wall formed with two opposite movable blocks 333 each movable on a respective of the two ramps 322 of the upper cover 32 by rotation of the rotation knob 33 to drive the movable shaft 332 of the rotation knob 33 to move in the chamber 321 of the upper cover 32 axially. Each of the movable blocks 333 of the movable shaft 332 of the rotation knob 33 is movable to extend into and rest on either one of the convex face 323 and the concave face 324 of the respective ramp 322 of the upper cover 32.

The locking rod 34 is extended through the upper cover 32. The upper portion of the locking rod 34 is provided with a substantially C-shaped snap ring 37 which is mounted in the rotation knob 33 and rested on a top of the movable shaft 332 of the rotation knob 33 so that the upper portion of the locking rod 34 is secured to the movable shaft 332 of the rotation knob 33 to move therewith.

The positioning device 3 further includes a fixing plate 39 mounted on the front wheel frame 12 to rotate therewith and having an end formed with a locking hole 390, a rotation shaft 38 rotatably mounted in the bushing 311 of the lower cover 31 and having a lower end extended through the fixing plate 39 and secured to the front wheel frame 12, a fixing sleeve 36 fixed on the lower portion of the locking rod 34 and detachably locked in the locking hole 390 of the fixing plate 39, and a spring 35 mounted on the locking rod 34 and biased between the upper cover 32 and the fixing sleeve 36 to push the fixing sleeve 36 outward from the sleeve 312 of the lower cover 31 toward the fixing plate 39.

As shown in FIG. 1, although the positioning device 3 is located under the pedal 11, the upper portion of the rotation knob 33 and the drive plate 331 are protruded outward from the pedal 11, so that a user can see the drive plate 331 of the rotation knob 33 clearly from the rear portion of the main frame 4.

Figure 5:
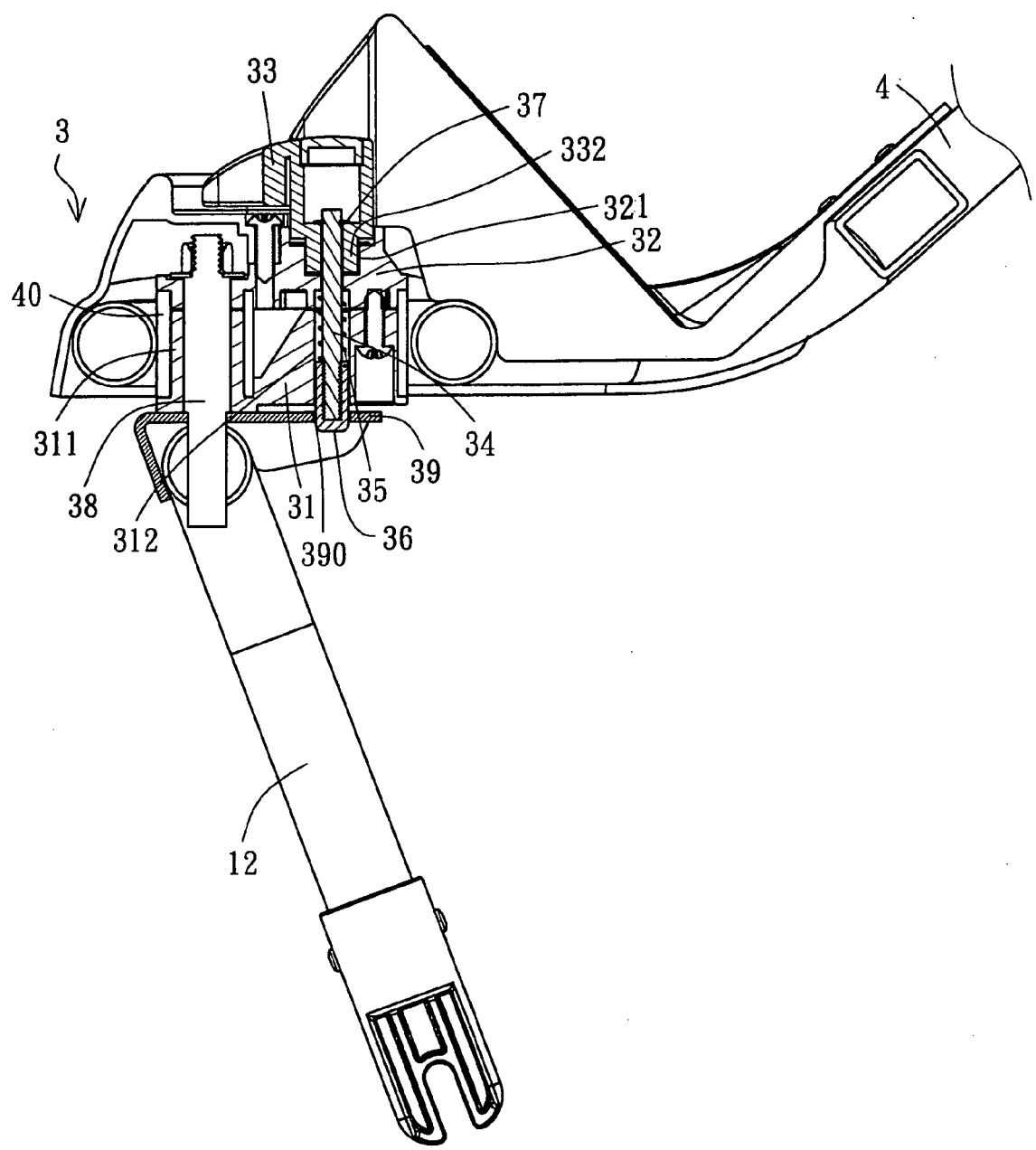
FIG. 5 is a side plan cross-sectional view of the stroller as shown in FIG. 1.
Figure 6:
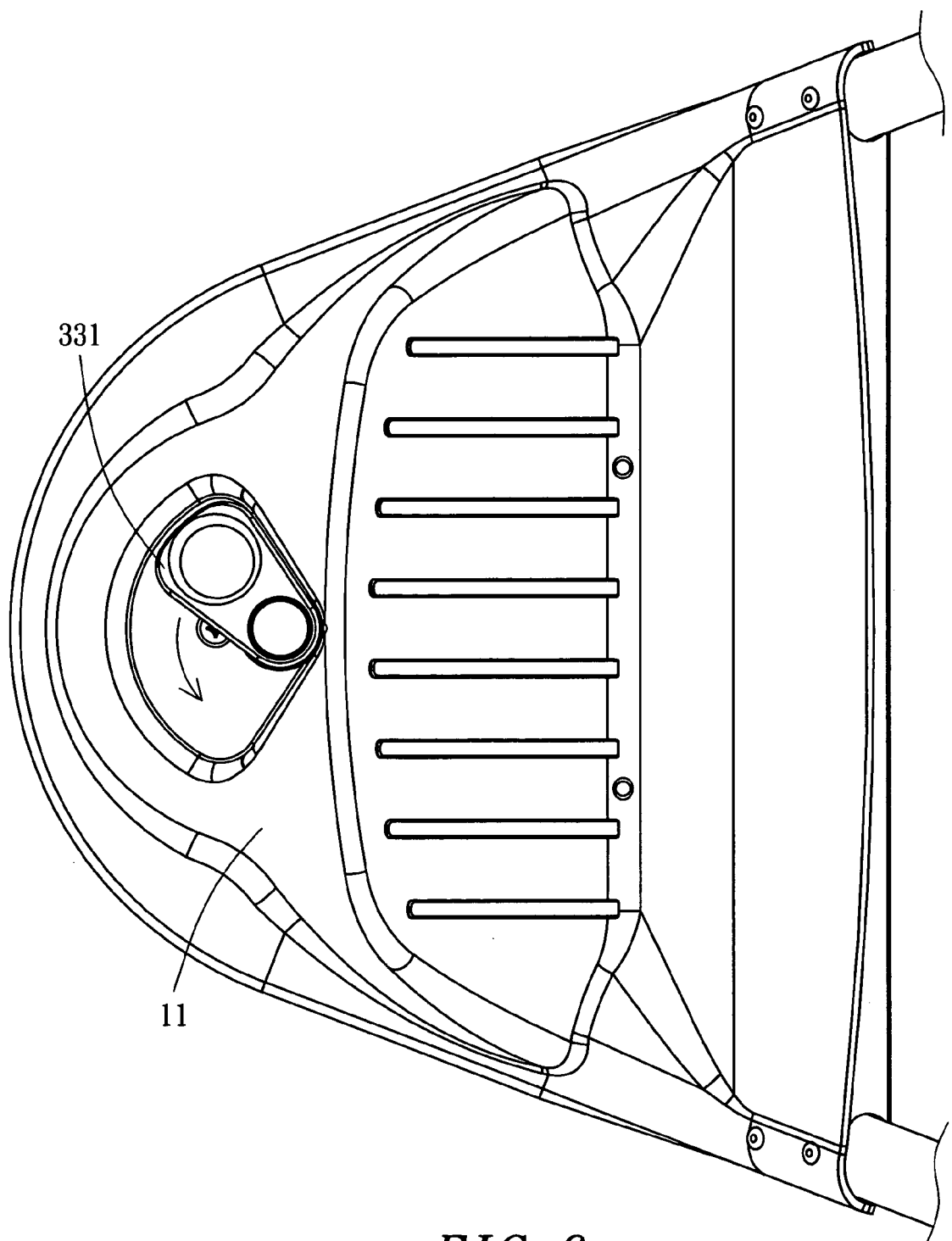
FIG. 6 is a top plan view of the stroller as shown in FIG. 1.

In operation, referring to FIGS. 5 and 6 with reference to FIGS. 1-4, the drive plate 331 of the rotation knob 33 is located at the left side of the pedal 11, while each of the movable blocks 333 of the movable shaft 332 of the rotation knob 33 is located at the lowermost portion of the chamber 321 of the upper cover 32. At this time, the fixing sleeve 36 is locked in the locking hole 390 of the fixing plate 39 to lock the fixing plate 39, so that the front wheel frame 12 is fixed without rotation.

Figure 7:
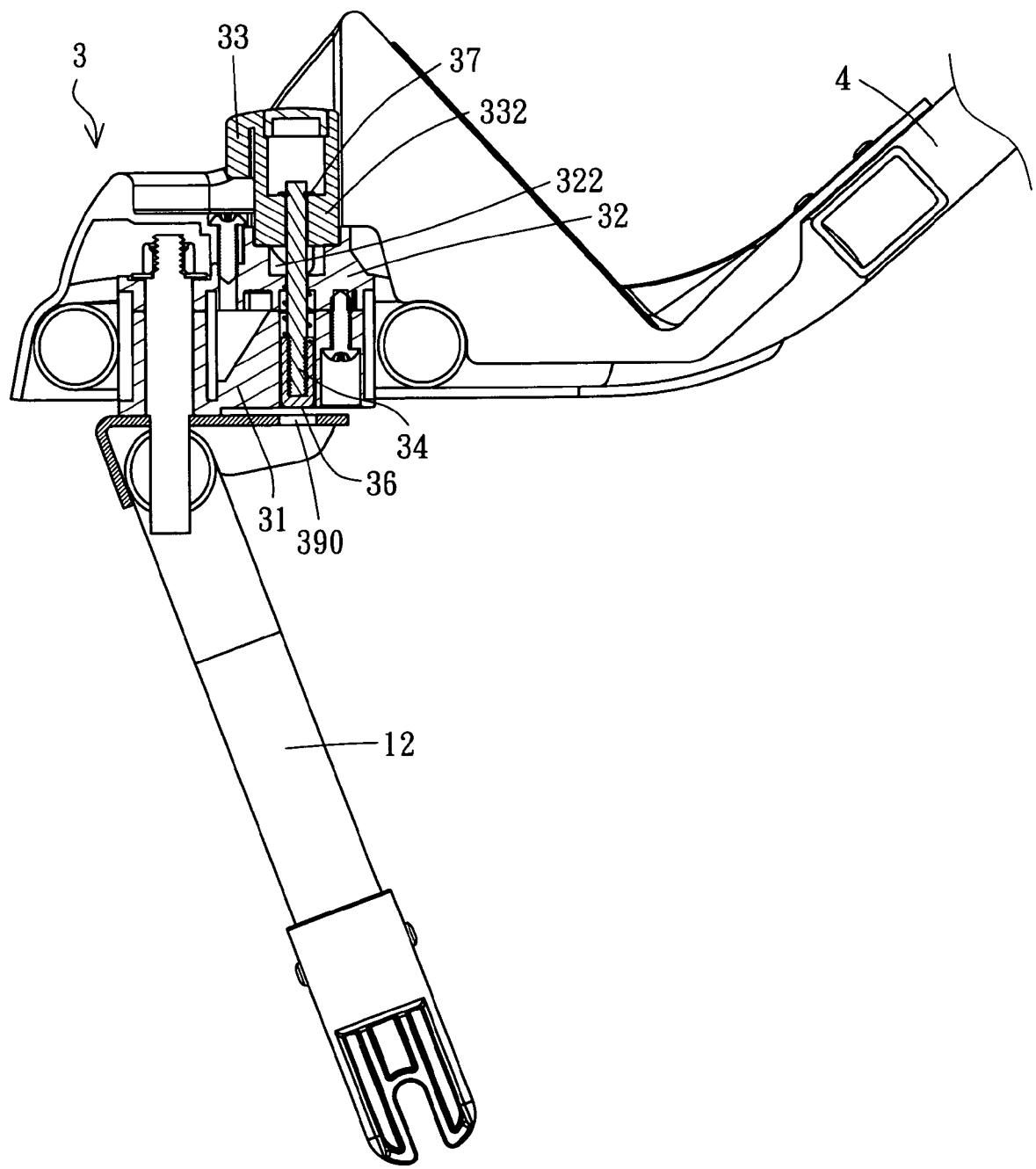
FIG. 7 is a schematic operational view of the stroller as shown in FIG. 5.
Figure 8:
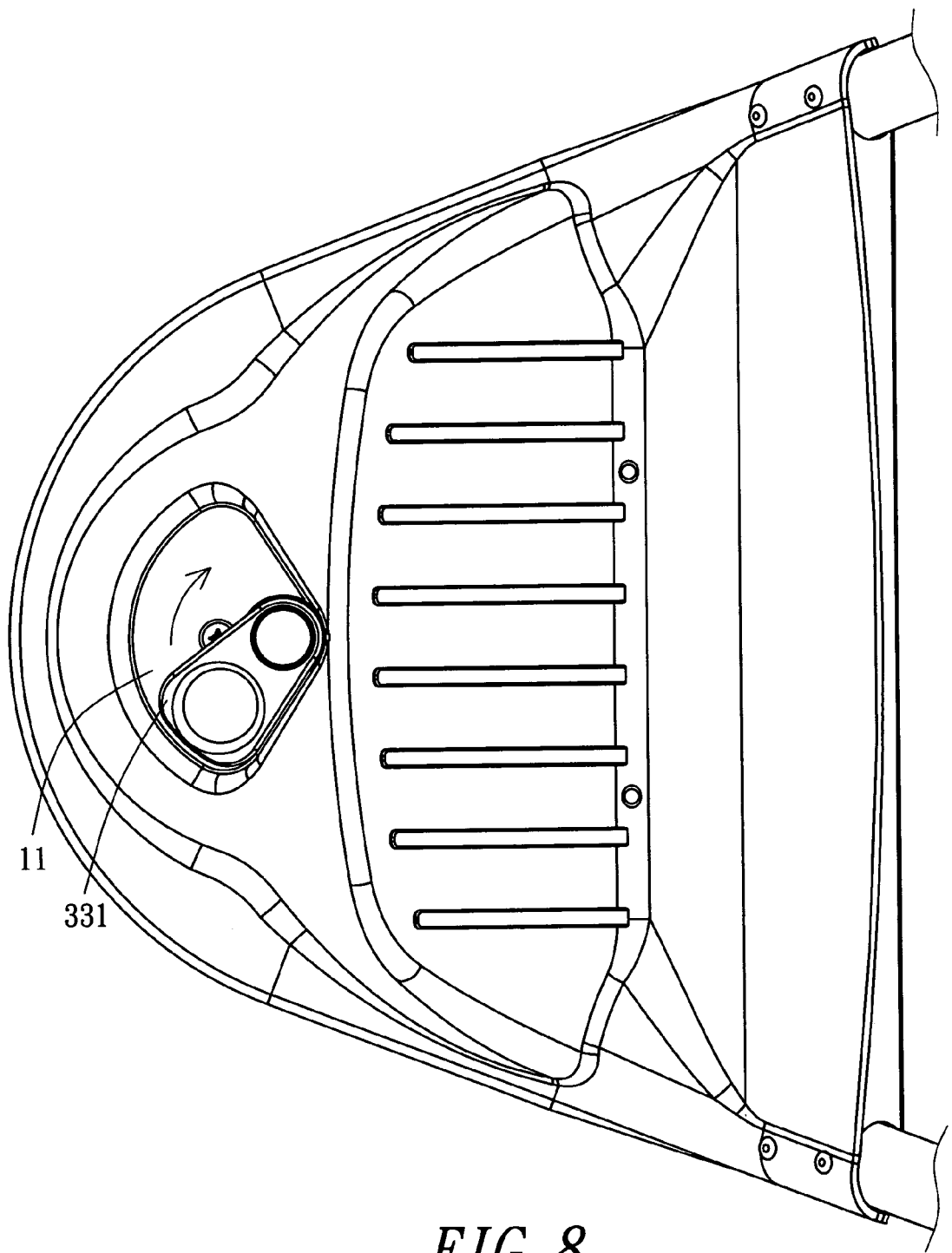
FIG. 8 is a schematic operational view of the stroller as shown in FIG. 6.
Figure 9:
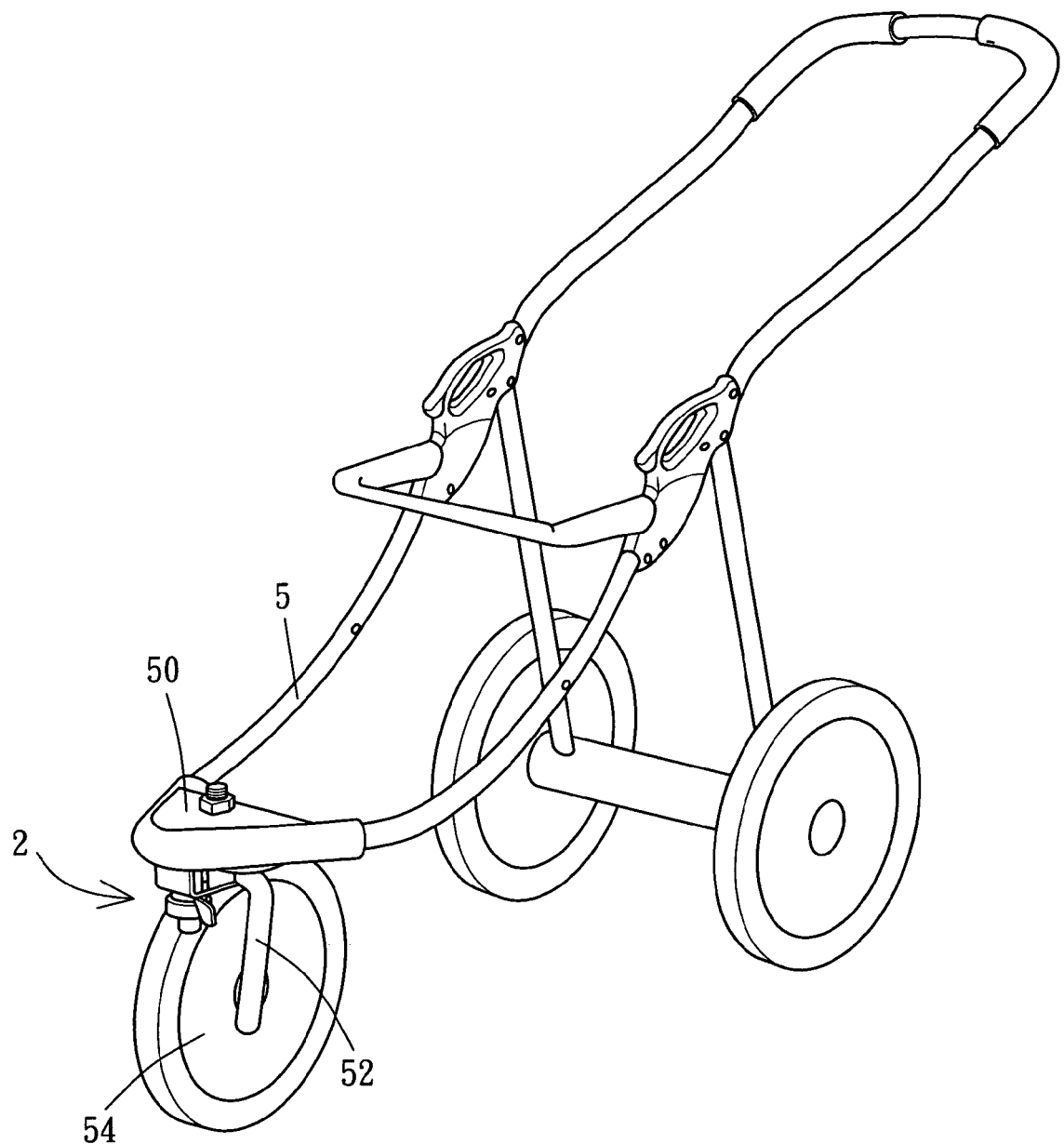
FIG. 9 is a perspective view of a conventional stroller in accordance with the prior art.
Figure 10:
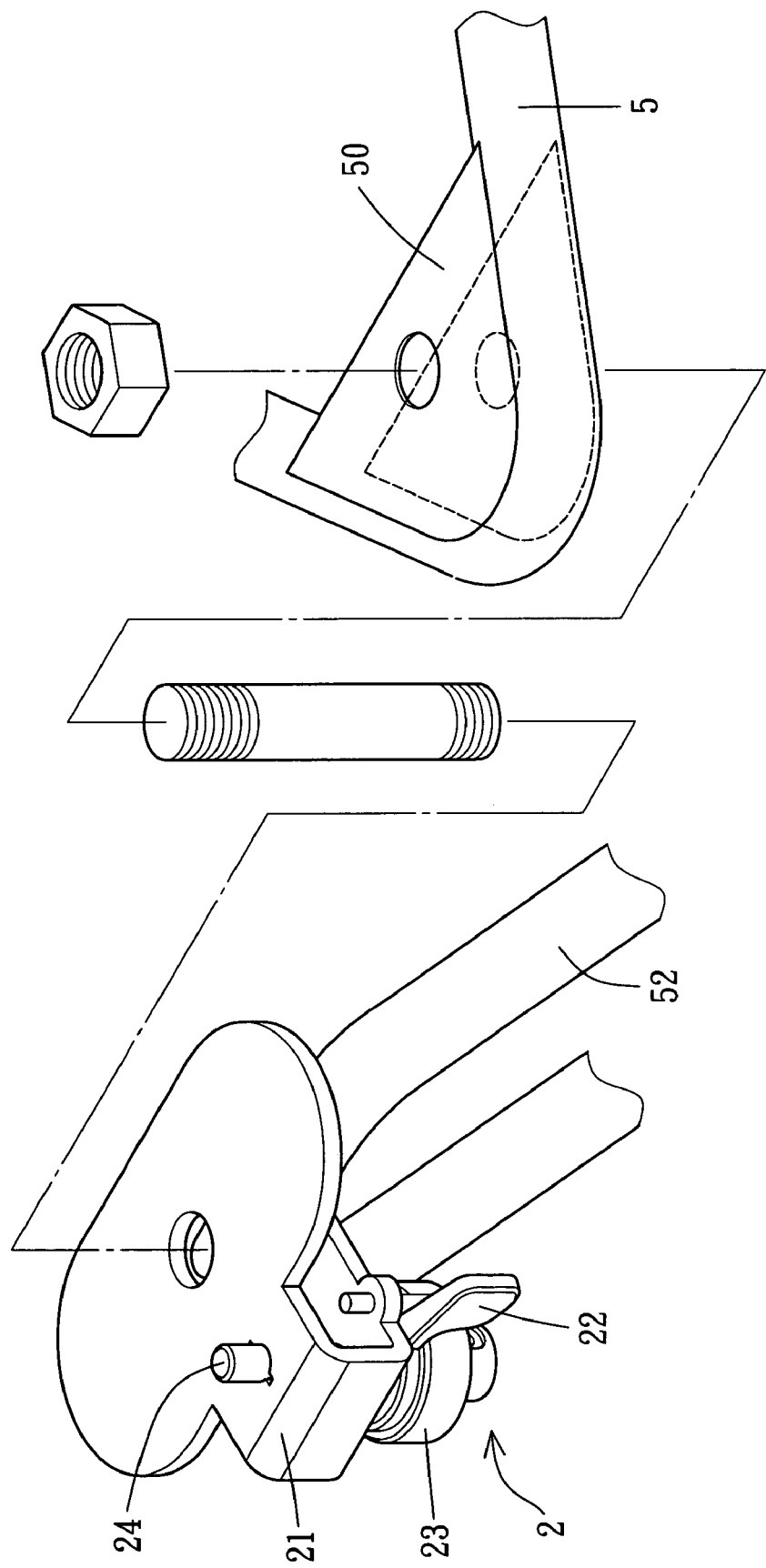
FIG. 10 is a partially exploded perspective view of the conventional stroller as shown in FIG. 9.
Figure 11:
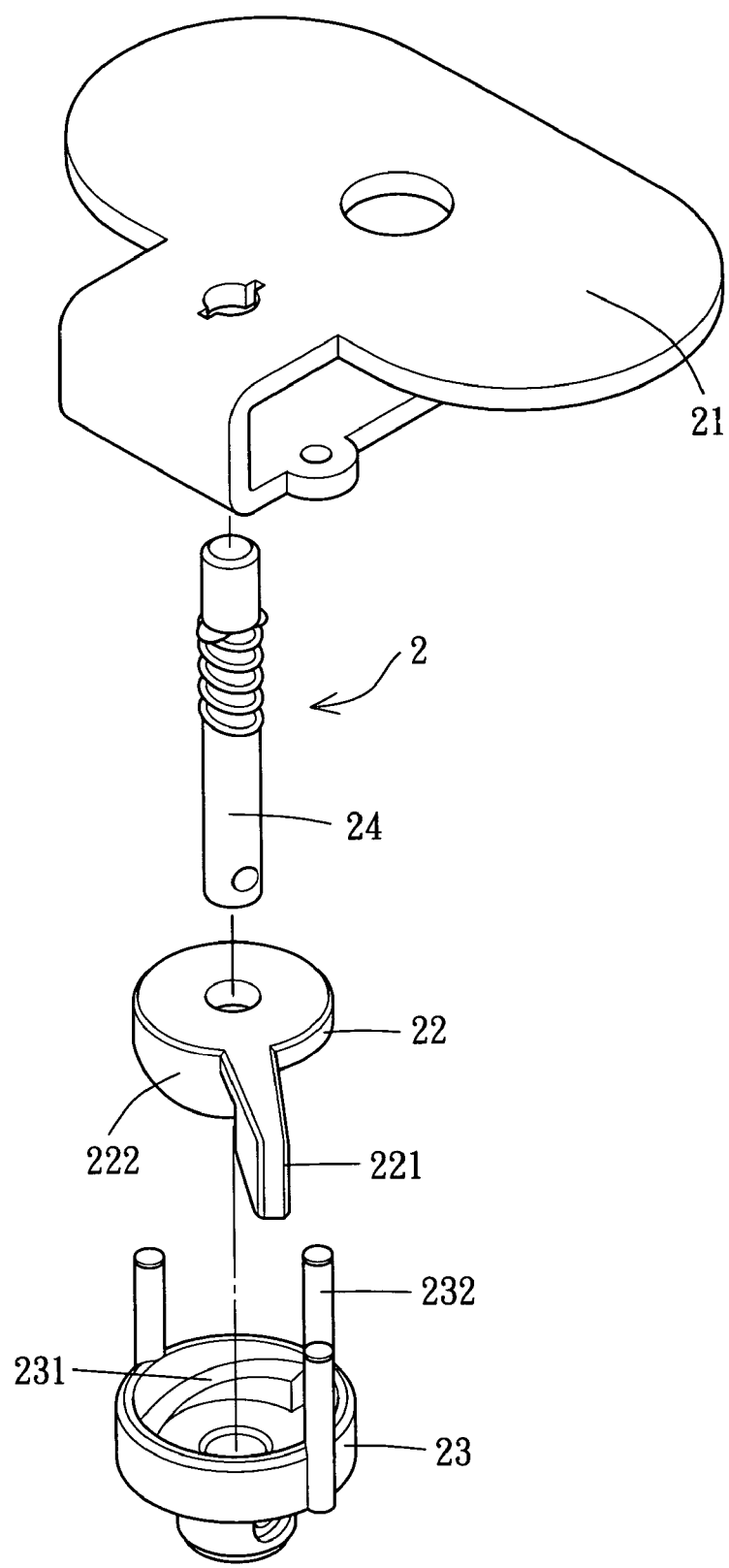
FIG. 11 is a partially exploded perspective view of the conventional stroller as shown in FIG. 9.
Figure 12:
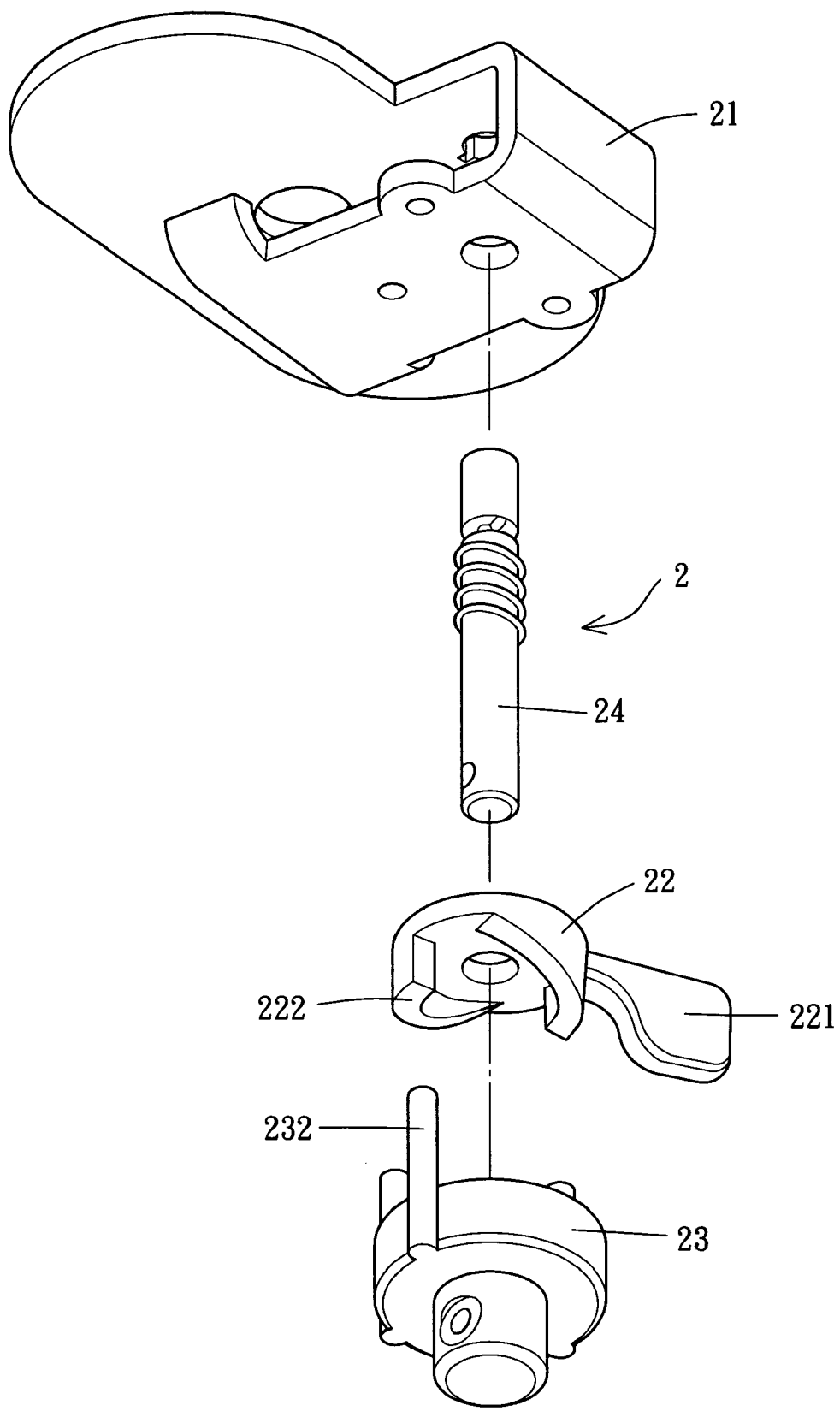
FIG. 12 is a partially exploded perspective view of the conventional stroller as shown in FIG. 9.
Figure 13:
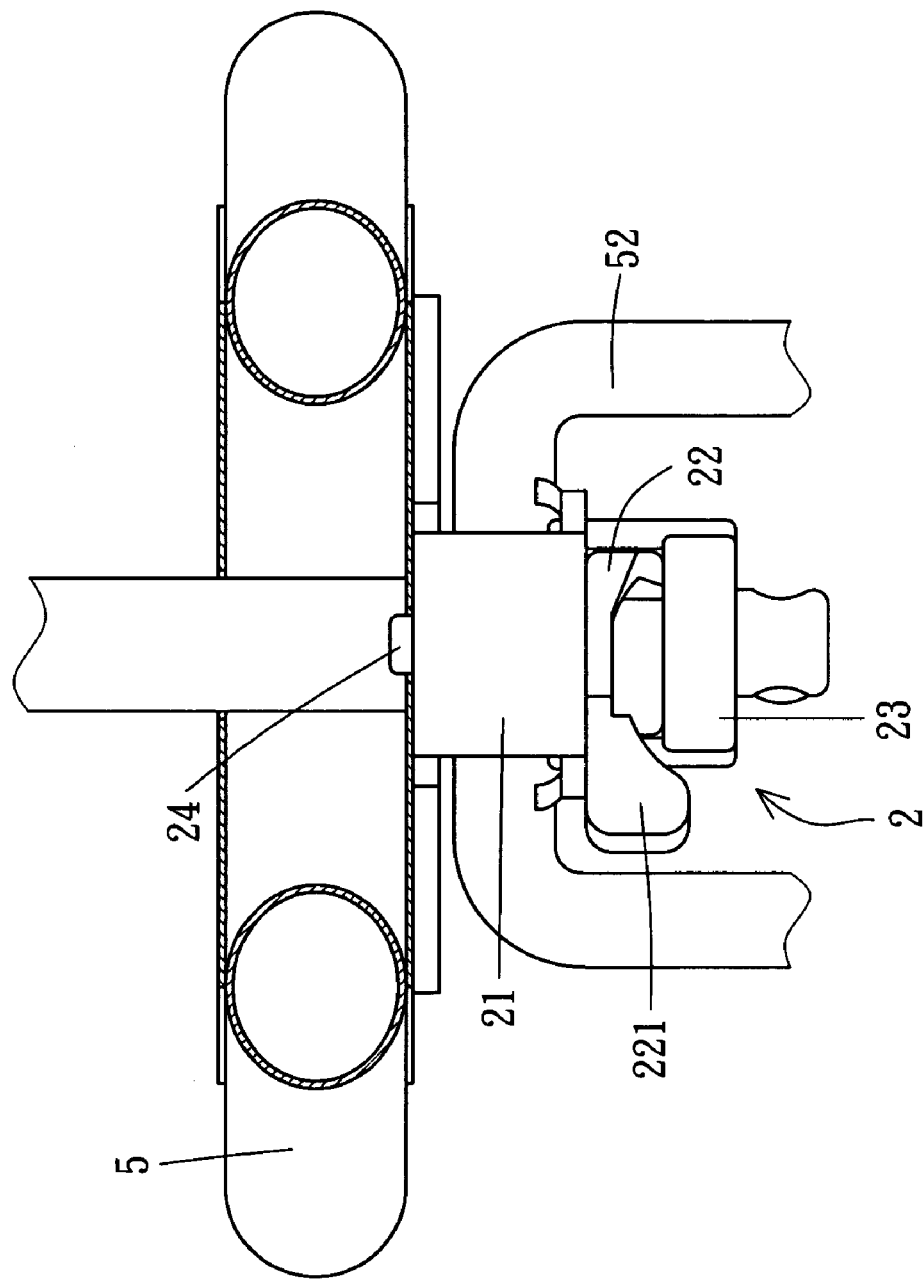
FIG. 13 is a front plan cross-sectional view of the conventional stroller as shown in FIG. 9.
Figure 14:
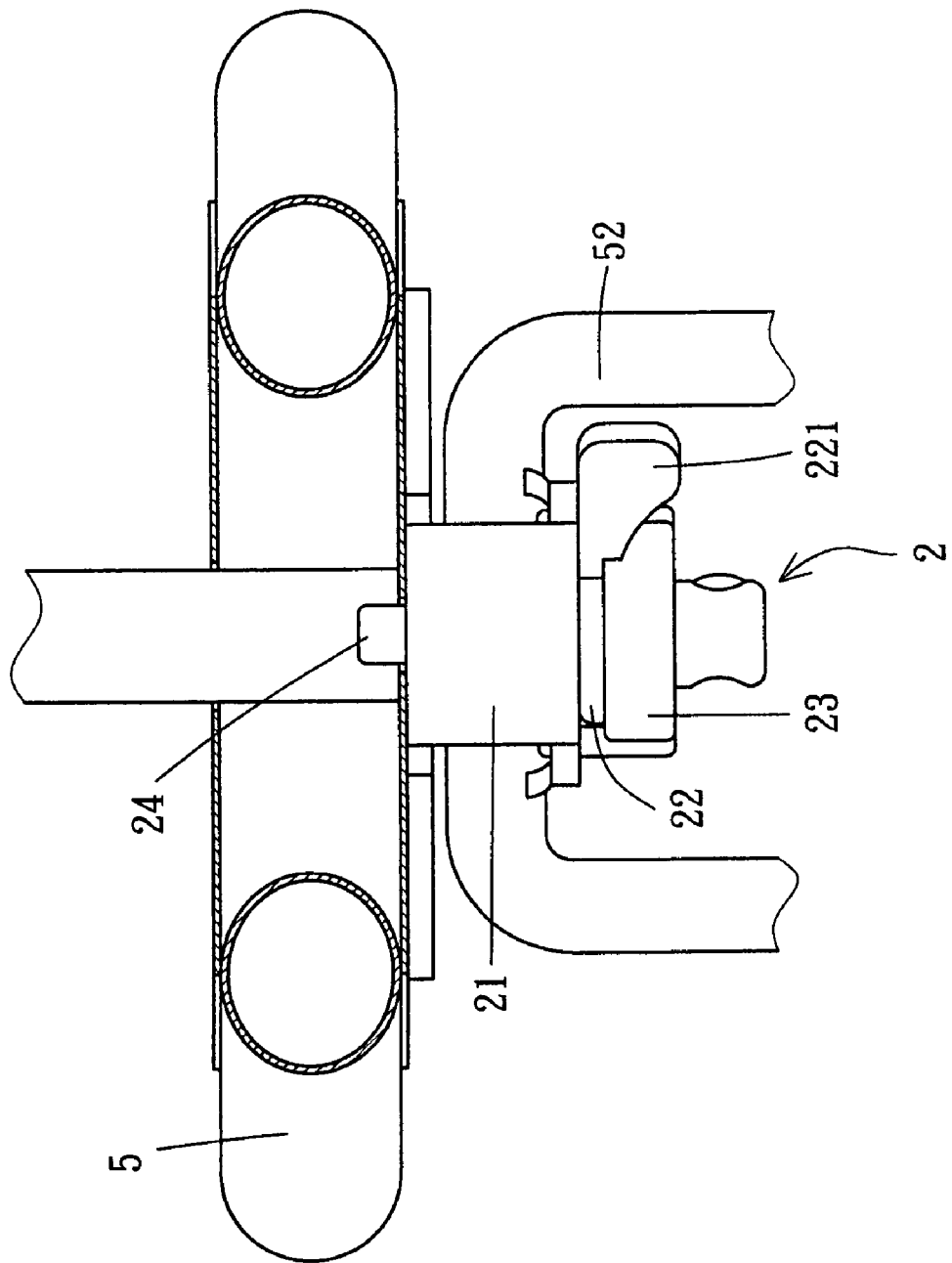
FIG. 14 is a schematic operational view of the conventional stroller as shown in FIG. 13.

Referring to FIGS. 7 and 8 with reference to FIGS. 1-4, when the drive plate 331 of the rotation knob 33 is driven to move rightward the right side of the pedal 11, each of the movable blocks 333 of the movable shaft 332 of the rotation knob 33 is movable on a respective of the two ramps 322 of the upper cover 32 by rotation of the rotation knob 33 to drive the movable shaft 332 of the rotation knob 33 to move upward in the chamber 321 of the upper cover 32 to lift the movable shaft 332 which lifts the locking rod 34 which lifts the fixing sleeve 36 and compress the spring 35, thereby detaching the fixing sleeve 36 from the locking hole 390 of the fixing plate 39 to unlock the fixing plate 39, so that the front wheel frame 12 is rotatable relative to the main frame 4 freely.

It is appreciated that, when each of the movable blocks 333 of the movable shaft 332 of the rotation knob 33 is movable from the convex face 323 into the concave face 324 of the respective ramp 322 of the upper cover 32, the locking rod 34 is moved downward by the restoring force of the spring 35 to hit the fixing plate 39 to produce a click sound so as to notify the user that the positioning device 3 is unlocked and the front wheel frame 12 is rotatable relative to the main frame 4 freely.

Accordingly, the front wheel frame 12 is locked to and unlocked from the main frame 4 by moving the drive plate 331 of the rotation knob 33, so that the positioning device 3 is operated easily and rapidly, thereby facilitating a user locking and unlocking the front wheel frame 12. In addition, when the positioning device 3 is unlocked, a click sound is produced so as to notify the user that the positioning device 3 is unlocked and the front wheel frame 12 is rotatable relative to the main frame 4 freely, thereby facilitating the user judging the state (locked or unlocked) of the front wheel frame 12.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A stroller, comprising:
   a main frame having a support seat;
   a pedal mounted on the main frame and located beside the support seat of the main frame;
   a front wheel frame releasably mounted on the main frame;
   a positioning device mounted between the main frame and the front wheel frame to releasably lock the front wheel frame on the main frame; wherein
   the positioning device includes:
   a lower cover mounted on a lower portion of the support seat of the main frame and having a sleeve;
   an upper cover mounted on an upper portion of the support seat of the main frame and having a chamber;
   a rotation knob rotatably mounted on the upper cover and having an upper portion formed with a drive plate protruded outward from the pedal for rotating the rotation knob and a lower portion formed with a movable shaft movably mounted in the chamber of the upper cover;
   a locking rod movably mounted in the sleeve of the lower cover and having an upper portion secured to the movable shaft of the rotation knob to move therewith.

2. The stroller in accordance with claim 1, wherein the locking rod has a lower portion movable between a first position where the front wheel frame is locked by the locking rod so that the front wheel frame is fixed on the main frame and a second position where the front wheel frame is unlocked from the locking rod so that the front wheel frame is rotatable relative to the main frame freely.

3. The stroller in accordance with claim 1, wherein the sleeve of the lower cover is extended into and received in the support seat of the main frame.

4. The stroller in accordance with claim 1, wherein the chamber of the upper cover has a substantially cylindrical shape.

5. The stroller in accordance with claim 1, wherein the movable shaft of the rotation knob is axially movable in the chamber of the upper cover by rotation of the rotation knob.

6. The stroller in accordance with claim 1, wherein the upper cover has two ramps located in the chamber, and the movable shaft of the rotation knob has an outer wall formed with two opposite movable blocks each movable on a respective of the two ramps of the upper cover by rotation of the rotation knob to drive the movable shaft of the rotation knob to move in the chamber of the upper cover.

7. The stroller in accordance with claim 6, wherein the two ramps of the upper cover are directed two opposite directions.

8. The stroller in accordance with claim 6, wherein the each of the two ramps of the upper cover has a top formed with a convex face and a concave face located at a rear portion of the convex face.

9. The stroller in accordance with claim 8, wherein each of the movable blocks of the movable shaft of the rotation knob is movable to extend into and rest on either one of the convex face and the concave face of the respective ramp of the upper cover.

10. The stroller in accordance with claim 1, wherein the upper portion of the locking rod is provided with a substantially C-shaped snap ring which is mounted in the rotation knob and rested on a top of the movable shaft of the rotation knob so that the upper portion of the locking rod is secured to the movable shaft of the rotation knob to move therewith.

11. The stroller in accordance with claim 1, wherein the locking rod is extended through the upper cover.

12. The stroller in accordance with claim 1, wherein the positioning device further includes a fixing sleeve fixed on a lower portion of the locking rod, and a spring mounted on the locking rod and biased between the upper cover and the fixing sleeve to push the fixing sleeve outward from the sleeve of the lower cover.

13. The stroller in accordance with claim 12, wherein the positioning device further includes a fixing plate mounted on the front wheel frame to rotate therewith and having an end formed with a locking hole, and a rotation shaft rotatably mounted in the lower cover and having a lower end extended through the fixing plate and secured to the front wheel frame, and the fixing sleeve is detachably locked in the locking hole of the fixing plate.

14. The stroller in accordance with claim 13, wherein the lower cover has a first end formed with the sleeve and a second end formed with a bushing mounted in the support seat of the main frame, and the rotation shaft is rotatably mounted in the bushing of the lower cover.

15. The stroller in accordance with claim 1, wherein the upper portion of the rotation knob is protruded outward from the pedal.

* * * * *